United States Patent [19]

Mizrahi

[11] Patent Number: 5,218,655
[45] Date of Patent: Jun. 8, 1993

[54] ARTICLE COMPRISING AN OPTICAL WAVEGUIDE WITH IN-LINE REFRACTIVE INDEX GRATING

[75] Inventor: Victor Mizrahi, Bedminster, N.J.

[73] Assignee: AT&T Bell Laboratories, Murray Hill, N.J.

[21] Appl. No.: 890,975

[22] Filed: May 29, 1992

[51] Int. Cl.[5] .............................................. G02B 6/34
[52] U.S. Cl. ...................................... 385/39; 385/37; 385/31; 385/24
[58] Field of Search ....................... 385/39, 24, 31, 37; 359/130, 569, 572

[56]  References Cited

U.S. PATENT DOCUMENTS

| 4,699,452 | 10/1987 | Mollenauer et al. | 385/39 X |
| 4,725,110 | 2/1988 | Glenn et al. | 250/3.61 |
| 4,807,950 | 2/1989 | Glenn et al. | 350/3.61 |
| 5,022,730 | 6/1991 | Cimini et al. | 385/37 X |
| 5,140,656 | 8/1992 | Hasegawa et al. | 385/39 X |

OTHER PUBLICATIONS

"Permanent Photoinduced Birefringence in a Ge-Doped Fiber", by F. Ouellette, Applied Physics Letters, vol. 58(17), Apr. 29, 1991, pp. 1813-1815.
"Narrow-Bandwidth Optical Waveguide Transmission Filters", by K. O. Hill et al., Electronics Letters, vol. 23, (1987), p. 465.
"Bragg Grating Formation and Germanosilicate Fiber Photosensitivity", by G. Meltz et al., SPIE, vol. 1516, International Workshop on Photoinduced Self-Organization in Optical Fiber, May 10-11, 1991, Quebec City, Canada, 16 pages.
"Shifts in Resonance Wavelengths of Bragg Gratings During Writing or Bleaching Experiments by UV Illumination Within Germanosilicate Optical Fibre", by E. Fertein, Electronics Letters, vol. 27, No. 20, Sep. 26, 1991, pp. 1838-1839.
"Photosensitivity in Optical Fiber Waveguides: Application to Reflection Filter Fabrication", by K. O. Hill et al., Applied Physics Letters, vol. 32(10), May 15, 1978, p. 647.

Primary Examiner—Frank Gonzalez
Assistant Examiner—Phan T. Heartney
Attorney, Agent, or Firm—Eugen E. Pacher

[57]  ABSTRACT

Broadband in-line gratings in optical waveguides are disclosed. The gratings have a bandwidth of at least 2 nm (preferably at least 4 nm) and a peak reflectivity of at least 70% (preferably at least 90%). Exemplarily, such gratings can be formed in $H_2$-treated Si-based fibers that support a normalized index change of at least $10^{-3}$. Gratings according to the invention can be used, for instance, to form pump radiation reflectors in an optical fiber communication system with Er-doped fiber amplifiers.

6 Claims, 1 Drawing Sheet

ARTICLE COMPRISING AN OPTICAL WAVEGUIDE WITH IN-LINE REFRACTIVE INDEX GRATING

FIELD OF THE INVENTION

This invention pertains to articles that comprise a length of optical waveguide whose refractive index varies periodically in the longitudinal direction.

BACKGROUND OF THE INVENTION

In-line optical fiber refractive index "gratings" are known. See, for instance, U.S. Pat. No. 4,807,950, incorporated herein by reference. See also U.S. Pat. No. 4,725,110, which claims a method of producing such a grating. The currently preferred method of writing an in-line grating into optical fiber comprises interference between two beams of actinic (typically UV) radiation in a portion of the fiber. The two beams are incident on the fiber in a transverse direction, the angle between the two beams (and the wavelength of the radiation) defining the grating spacing.

Typically fiber gratings are formed in Ge-doped fiber. See, for instance, F. Ouellette et al., *Applied Physics Letters*, Vol. 58(17), p. 1813, which inter alia discloses that the sensitivity of the Ge-doped fiber to actinic radiation can be enhanced by a thermal hydrogen treatment (4 hours at 400° C. in 12 atm of $H_2$). See also U.S. patent application Ser. No. 643,886, filed Jan. 18, 1991 for R. M. Atkins et al., which discloses a process of manufacturing Ge-doped fiber that enhances the $GeO/GeO_2$ ratio in the core of the fiber, thereby enhancing the sensitivity of the fiber to actinic radiation. The process involves, exemplarily, collapsing the preform tube in a substantially oxygen-free atmosphere.

In-line optical fiber refractive index gratings can advantageously be incorporated into, for instance, optical fiber communication systems. An exemplary application of such a grating is as a reflector of pump radiation in optical fiber amplifiers, e.g., Er-doped fiber amplifiers. Since currently used pump radiation sources typically emit over a relatively wide spectral region (e.g., >10 nm), it would be desirable to have available in-line fiber reflectors that have a relatively wide bandwidth, preferably, but not necessarily, as wide as the bandwidth of the pump source. Other exemplary potential applications of a relatively wide bandwidth in-line optical fiber grating are for flattening the gain curve of an optical fiber amplifier (e.g., an Er-doped fiber amplifier) and as a wide-band transmission filter, analogous to the narrow-band filter proposed by K. O. Hill et al., *Electronics Letters*, Vol. 23, p. 465 (1987).

International Patent application PCT/GB91/00797 (publication number WO 91/18434) discloses a broadband fiber grating that utilizes periodic fiber deformation to achieve periodic variation of the propagation constant.

Despite the clear need for optical fiber index gratings that have relatively large bandwidth, practitioners have up to now failed to produce such gratings. For instance, G. Meltz et al, *SPIE*, Vol. 1516, International Workshop on Photoinduced Self-Organization in Optical Fiber; Quebec City, Canada, May 10-11, 1991, report a "broadband" grating that had a transmission bandwidth of only 1.1 nm. The minimum transmissivity of the grating was about 35%, implying a peak reflectivity of only about 65%. See FIG. 4 of the publication. The peak index change in the grating was reported to be $5.5 \times 10^{-4}$. E. Fertein et al., *Electronics Letters*, Vol. 27(20), pages 1838-1839, disclose a grating in $GeO_2$ doped silica fiber that allegedly had substantially zero transmittance, but a FWHM (full width at half maximum) bandwidth of only 0.7 nm.

This application discloses strong, wide bandwidth in-line optical waveguide gratings that can advantageously be used in such applications as optical fiber communications or fiber lasers.

GLOSSARY AND DEFINITIONS

An "optical waveguide" herein is an elongate structure that comprises a "core" of relatively high refractive index glass that is at least partially surrounded by a "cladding" of relatively low refractive index glass, and that is adapted for transmitting therethrough in the longitudinal direction electromagnetic radiation of "optical" wavelength, exemplarily 0.8-1.6 μm.

A "grating" herein is a portion of an optical waveguide wherein the refractive index varies as a function of distance along the waveguide. Typically, but not necessarily, the index variation is substantially confined to the core of the waveguide. The variation typically, but not necessarily, is such that the distance between adjacent index peaks is constant.

The "bandwidth" of a grating is the difference between those two wavelengths at which the reflectivity of the grating is 50% of the peak reflectivity of the grating.

THE INVENTION

Figure 1:
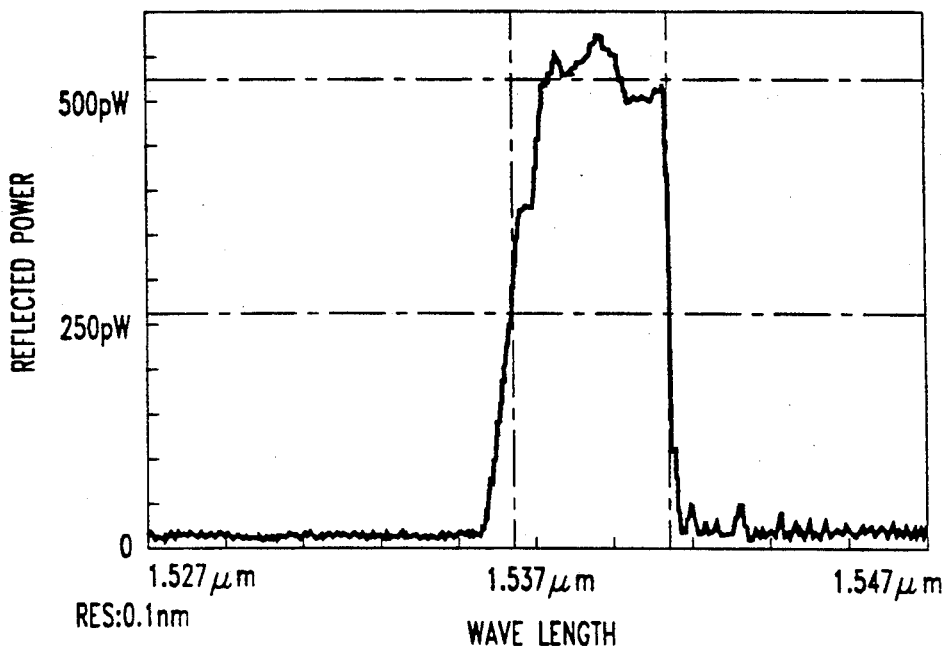
FIG. 1 shows measured data on reflected power vs. wavelength for an exemplary grating according to the invention.

I have discovered that it is possible to make in-line refractive index gratings of substantially greater bandwidth than prior art gratings, provided the high-silica waveguide is appropriately prepared.

The invention is an article (exemplarily but not necessarily an optical fiber communication system) that comprises means for generating optical radiation, means that are responsive to said optical radiation, and an optical waveguide transmission path that links the generating means (typically a laser diode) and the responsive means (exemplarily a photodetector). A portion of the transmission path is an optical waveguide (fiber or planar waveguide) that has a longitudinally varying refractive index (i.e., comprises a grating), the index varying such that the grating can reflect radiation of a predetermined wavelength. The "optical radiation" emitted by the generating means frequently is infrared radiation (e.g., about 1.3 or 1.55 μm), and the radiation reflected by the grating may or may not be of the same wavelength as the radiation emitted by the generating means. Significantly, the grating has a bandwidth of at least 2 nm, preferably 4 nm or more, and a peak reflectivity of at least 70%, preferably 90% or greater. Broadband reflectors having reflectivity less than about 70% are currently not thought to be commercially significant.

Typically, gratings according to the invention satisfy the condition $KL \gtrsim 1.2$, where for a uniform grating the coupling constant $K = \pi \Delta n/\lambda$, and L is the grating length. $\Delta n$ is the (un-normalized) maximum index difference in the grating, and λ is the center wavelength of the grating.

Exemplarily, the grating exists in silica-based (typically at least 80% $SiO_2$) fiber whose core comprises Ge, and the normalized refractive index variation $\Delta (\Delta = \Delta n/n$, where n is the relevant refractive index) in the grating is at least $10^{-3}$. Exemplarily such a large index variation is attained by a process that comprises maintaining, prior to "writing" the grating by exposure of the fiber to actinic (typically UV) radiation, the fiber in a hydrogen-containing atmosphere at a relatively low temperature, e.g., at most about 250° C. Typically the partial pressure of hydrogen in the atmosphere is greater than 1 atmosphere, frequently greater than 10 atmospheres, and the hydrogen treatment is carried out such that irradiation can result in a normalized refractive index change of at least about $10^{-3}$. Exemplarily the grating is formed in a Ge-doped silica-based optical fiber which, absent the hydrogen treatment, exhibits substantially no photorefractive effect, i.e., in which, absent a hydrogen treatment, a maximum normalized index variation of less than $10^{-5}$ is attainable by exposure to UV radiation.

The hydrogen treatment is described in greater detail in a co-assigned U.S. patent application Ser. No. 07/878,802, entitled "Method of Making an Article Comprising an Optical Waveguide", filed May 5, 1992, whose inventors are R. M. Atkins, P. J. Lemaire, V. Mizrahi, and K. L. Walker, and whose disclosure is incorporated herein by reference.

Although $H_2$-sensitization is currently preferred, it is not necessarily the only waveguide preparation that can make possible gratings according to the invention. For instance, we have observed large refractive index changes in some highly Er-doped fibers.

An exemplary grating according to the invention was made as follows. A length of commercially available single mode optical fiber (AT&T's 5D fiber, which has a germanosilicate core, with about 2.6 mole % $GeO_2$) was maintained for 24 hours at 75° C. in 9120 psi hydrogen, resulting in about $3.93 \times 10^4$ ppm of $H_2$ in the fiber core. An excimer-pumped frequency-doubled tunable dye laser, emitting radiation of wavelength 242 nm, was used to write, in conventional manner, a grating (period 0.5 μm) into the thus prepared fiber. The laser emitted pulses of approximate duration 15 ns, at a rate of 25 pulses/second, yielding an average power of about 44 mW. Exposure time was 10 minutes. The resulting normalized index change Δ was about $2.6 \times 10^{-3}$, and the effective length of the resulting grating was 3 mm. FIG. 1 shows the measured reflection spectrum of the fiber with the grating therein. The half-power points are at 1.53664 and 1.54048 μm, respectively, giving a bandwidth of 3.84 nm. The peak reflectivity is essentially 100%.

Figure 2:
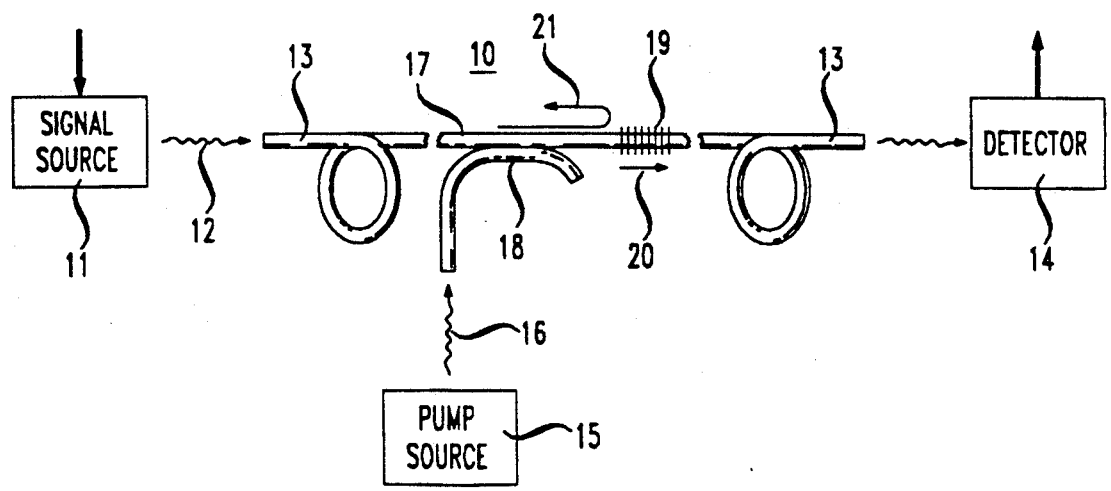
FIG. 2 schematically depicts an exemplary optical fiber communication system according to the invention.

FIG. 2 schematically depicts an exemplary article according to the invention, namely, on optical fiber communication system. Signal source 11 emits signal radiation 12 (e.g., $\lambda_0 \sim 1.5$ μm), which is coupled into optical fiber 13 and transmitted therethrough to optical amplifier 10. The amplifier comprises a length of Er-doped optical fiber 17, pump radiation source 15 and directional coupler 18. Pump radiation 16 (e.g., $\lambda_p \sim 0.98$ μm) is transmitted to the coupler through a short length of fiber and coupled into the amplifier fiber 17, wherein it propagates towards grating 19, which serves to reflect the pump radiation and pass the signal radiation, as indicated by means of arrows 21 and 20, with the former pertaining to the pump radiation and the latter to the signal radiation. The signal radiation propagates further to detector 14, which provides an electrical signal in response to the optical signal that is incident thereon. As will be readily apparent, the presence of grating 19 increases amplifier efficiency since it can provide two passes of the pump radiation.

Although FIG. 2 shows a single grating, it is contemplated that optionally two or more gratings are concatenated to result in even wider reflection bandwidth. Advantageously the gratings differ in center wavelength, exemplarily by about ½ of the bandwidth of an individual grating, and are advantageously arranged with increasing center wavelengths in the "downstream" direction.

In a further exemplary embodiment, a grating was produced that had reflection bandwidth of 7.1 nm and a peak reflectivity of essentially 100% . This grating was produced substantially as described above, except that the fiber had substantially higher Ge content.

I claim:
1. An article comprising
   a) means for generating optical radiation of wavelength $\lambda_0$;
   b) means responsive to said optical radiation;
   c) an optical waveguide radiation transmission path linking the means of a) and the means of b), a portion of said transmission path being an optical waveguide which comprises a core region that is at least partially surrounded by a cladding, the core having a longitudinally varying refractive index, the index varying such that said portion of the transmission path can reflect radiation of a predetermined wavelength, said portion to be referred to as the grating, associated with said grating being a center wavelength, a reflection bandwidth and a peak reflectivity; characterized in that
   the grating has a reflection bandwidth of at least 2 nm and a peak reflectivity of at least 70% .

2. An article according to claim 1, wherein the grating has a reflection bandwidth of at least 4 nm and a peak reflectivity of at least 90% .

3. An article according to claim 1, wherein the article is an optical fiber communication system comprising at least one fiber optical amplifier, said amplifier comprising a source of pump radiation of wavelength less than $\lambda_0$ and means for coupling the pump radiation into the optical fiber transmission path, the grating being an optical fiber grating selected such that the grating reflects at least some of the pump radiation.

4. An article according to claim 3, wherein associated with the source of pump radiation is an emission spectrum of width less than or equal to the reflection bandwidth of the grating.

5. An article according to claim 3, wherein associated with the source of pump radiation is an emission spectrum of width greater than the reflection bandwidth of the grating, and wherein the optical fiber transmission path comprises at least one further grating selected such that the further grating also reflects at least some of the pump radiation, the center wavelength $\lambda_2$ of the further grating differing from the center wavelength $\lambda_1$ of said grating.

6. An article according to claim 5, wherein $\lambda_1 < \lambda_2$, and wherein said grating is located between the further grating and the means for coupling the pump 3 radiation into the optical fiber transmission path.

* * * * *